Dec. 12, 1950 W. R. YOUNG, JR 2,533,543

OFF-CHANNEL SQUELCH CIRCUIT FOR RADIO RECEIVERS

Filed Dec. 6, 1947 2 Sheets-Sheet 1

INVENTOR
W. R. YOUNG, JR.
BY G. H. Stevenson
ATTORNEY

OFF-CHANNEL SQUELCH CIRCUIT FOR RADIO RECEIVERS

Filed Dec. 6, 1947 2 Sheets-Sheet 2

INVENTOR
W. R. YOUNG, JR.
BY G H Stevenson
ATTORNEY

Patented Dec. 12, 1950 2,533,543

UNITED STATES PATENT OFFICE 2,533,543

OFF-CHANNEL SQUELCH CIRCUIT FOR RADIO RECEIVERS

William R. Young, Jr., Summit, N. J., assignor to Bell Telephone Laboratories, Incorporated, New York, N. Y., a corporation of New York Application December 6, 1947, Serial No. 790,081

8 Claims. (Cl. 250—20)

This invention relates to control circuits for radio receivers, and more particularly to circuits of the kind known as squelch circuits which automatically control the condition of the receiver output circuit upon the reception of a carrier wave of appropriate frequency and amplitude.

The principal object of the invention is to prevent the operation of the control circuit by carrier waves of frequencies other than that to which the receiver is tuned. Such waves may be called off-frequency or off-tune carriers.

The term squelch, or squelching, as used in connection with radio receivers refers to the closing of the audio stage and holding it inoperative until it is automatically rendered operative by the reception of a carrier wave to which the receiver is tuned. By "closing the squelch" is meant the process of rendering the receiver output quiet, and by "opening the squelch" the process of making the receiver operative in the reproduction of signals.

The squelch circuit of this invention is applicable to either an amplitude modulation or a frequency modulation type of receiver.

Squelch circuits of the past have had for their object the disabling of the audio stage by noise voltages in the absence of a carrier, or accompanying a relatively weak carrier, and the opening of the audio by an in-tune carrier of satisfactory signal-to-noise ratio. The squelch permits the operation of the receiver in a condition ready for the reception of a signal, but without reproducing undesirable noise in the meantime. Such circuits have been particularly useful in mobile radiotelephone systems.

The squelch circuits of the prior art, however, generally have the defect that they are capable of being opened by a relatively strong off-frequency carrier. This is due to two circumstances: first, the fact that the channel frequencies assigned for high-frequency radio communication are closely spaced; and second, the fact that the selective circuits of the usual receivers are not sufficiently sharp to prevent nearby carriers from entering the detector. This invention avoids the need of complex circuits in the receiver to obtain the required sharpness by imparting to the squelch circuit a frequency selective characteristic, as hereinafter described, which discriminates against the operation of the receiver by adjacent carriers.

A feature of the invention is the utilization of the high frequency oscillations at a point in the receiver ahead of the signal detector for the derivation of the voltages that control the squelch.

Another feature is the derivation of the control voltages for the operation of the squelch from points in the receiving circuit which exhibit differences in the degree of frequency selectivity.

The usual receiver contains a succession of resonant elements tuned to the mid-frequency of the receiver band. As incoming waves progress through the receiver, any other frequencies they may contain will be more and more reduced in amplitude relative to the resonant frequency. That is to say, the compounding action of the successive tuned elements results in a sharper tuning at a later stage than at some earlier stage. Advantage is taken of this property to derive the control voltages used in the invention. The voltage at some point in the receiver where the tuning is relatively broad is rectified to obtain a direct current voltage of one polarity. The voltage at a point further along in the circuit, where the tuning is sharper, is rectified to obtain a direct current voltage of the opposite polarity. The two rectified voltages are proportioned and combined in a differential manner so that the resultant voltage has one polarity for frequencies outside the receiver band and the opposite polarity for frequencies within the band. Means are provided for causing the voltage of one sign to hold the squelch closed, and the voltage of the opposite sign to keep it open.

Thus the principle involved in the invention is the use for control purposes of voltages of opposite polarity derived from two networks or circuits, or two parts of the same network, which have different voltage-frequency response characteristics, one being broader than the other. The networks may be constituted by the usual tuned circuits in the signal path of the receiver or they may, if desired, be located in auxiliary branches. They may take various forms, certain of which will be described and illustrated.

The circuits of the invention have certain further operating advantages, namely, that the control voltages, being derived directly from the high frequency carrier waves, do not include any signal components and are not likely to be affected by variations in the signal, and also that off-tune carriers when received produce a control voltage which holds the squelch closed. A further operating advantage arising from the use of the high frequency waves is that the squelch is not noticeably susceptible to closing in the presence of strong speech signals.

While adjustments in the circuit of the invention may be made so as to prevent the opening of the squelch by noise as well as by an off-frequency carrier, and yet allow it to open in the presence of an in-tune carrier, in order to insure still greater protection against noise without impairing other operating characteristics, it may be advantageous to use it in conjunction with some form or adaptation of noise squelch now commonly employed.

In connection with the following detailed description of the invention, reference is made to the accompanying drawings, of which:

Figure 1:
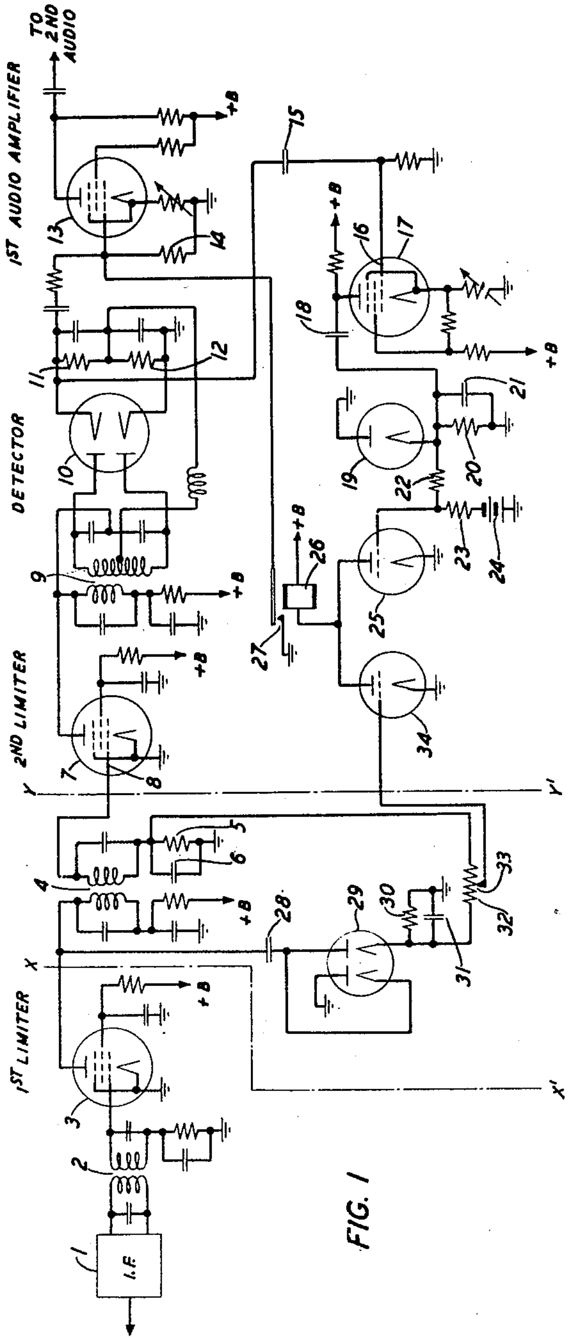
Fig. 1 is a schematic representation of a frequency modulated radio receiver embodying the invention.

Referring to Fig. 1, there is shown schematically a portion of a superheterodyne frequency modulation receiver which is provided with a noise squelch circuit together with one form of the off-frequency squelch of this invention. For convenience, parts of the receiver are omitted, such as those elements preceding the last intermediate frequency amplifier and following the first audio amplifier, since these are well known to those versed in the art and are not needed for an understanding of the invention. The heater elements for the cathodes of the thermionic vacuum tubes used are also omitted. The circuit includes intermediate frequency amplifier 1, coupling network 2, first limiter pentode tube 3, tuned transformer 4 which couples limiter tube 3 to a second limiter tube 7, also a pentode, a balanced frequency detector including discriminator network 9 and double diode detector tube 10 with load resistors 11 and 12, and first audio amplifier tube 13.

The frequency modulation network 9 may be of any well-known form and is shown as one form of the center-tapped secondary type of discriminator. The action of the detector circuit is to develop across cathode load resistors 11 and 12 an audio frequency voltage of the same frequency as the original modulating signal and proportional in magnitude to the instantaneous frequency deviation of the modulated carrier. This voltage is amplified by audio tube 13. Superimposed on the signal voltage there may be also a noise voltage of indiscriminate frequency.

The receiver includes a noise squelch circuit of a common form which comprises coupling condenser 15, noise amplifier tube 17, coupling condenser 18, rectifier tube 19, cathode resistor 20 in shunt with condenser 21, resistors 22 and 23, voltage source 24, direct current amplifier tube 25, and relay 26 with contacts 27.

The off-channel squelch circuit of my invention comprises transformer 4 which couples limiters 3 and 7 of the radio receiver, resistor 5 in shunt with condenser 6, coupling condenser 28, rectifier tube 29, cathode resistor 30 with shunting condenser 31, potentiometer 32 with slider 33, direct current amplifier tube 34, and relay 26 with contacts 27.

Rectifier 29 is shown as a double diode connected to produce voltage doubling. A single diode rectifier might be used at this point if adequate voltage is available, and rectifiers other than the thermionic type might also be used.

It will be seen that relay 26 is common to the plate circuits of tubes 34 and 25. If either tube is made conducting by the action of one or other of the squelch circuits, contacts 27 will be closed and will short-circuit the input resistor 14 of audio tube 13, thereby squelching the receiver output. In this manner either squelch circuit is capable of acting independently of the other.

In explaining first the operation of the simple noise squelch, it will be assumed that relay 26 is connected to the plate of tube 25 but is disconnected from the plate of tube 34. Under these conditions the off-channel squelch would be inoperative.

In the absence of a carrier at the input to the receiver, noise voltage developed and amplified in the receiver will appear at the output of detector tube 10, across resistors 11 and 12. This voltage is amplified by tube 17. Coupling condenser 15 is connected between the voltage source and control grid 16 of tube 17. Its capacitance should be small enough to prevent any frequencies in the audio range from getting through to the grid. A filter suitably designed for this purpose may be substituted for the condenser. After amplification by tube 17 the noise voltage is rectified by diode 19 in such a manner that a positive voltage is developed across resistor 20, which is in shunt with condenser 21. The positive voltage so derived is applied to the grid of tube 25 in combination with a negative voltage obtained from voltage source 24. These two voltages act in opposition and the net voltage at the grid will depend, in magnitude and sign, upon the relative contributions of the two voltages as determined by the values of resistances 22 and 23. If the net voltage is more positive than the cut-off value, tube 25 will conduct. If it is more negative than the cut-off value, the tube will not conduct.

With no carrier at the input terminals of the receiver the rectified noise voltage across resistor 20 may be large in magnitude, and may be made to reach any desired value by suitable amplification by tube 17 before rectification. When a carrier is present, limiters 3 and 7 act to reduce the level of noise appearing at the output of detector tube 10, and in consequence the rectified voltage across resistor 20. In a properly designed frequency modulation receiver a small carrier voltage applied at the input will produce a large reduction in noise voltage. This is a well-known characteristic of this type of receiver.

It follows from the above, therefore, that with no received carrier the contribution of the positive voltage across resistor 20 may be made to predominate and cause tube 25 to conduct, thereby closing the squelch. With the appearance of a carrier the positive voltage rapidly decreases with the intensity of the carrier, with the result that the negative voltage contribution from source 24 will predominate and cause tube 25 to be cut off, thereby opening the squelch. The circuit is ordinarily proportioned so that the squelch will be closed when there is little or no carrier but a large volume of noise present, and will be opened when the carrier has increased to a usable value.

The type of noise squelch just described, or some variation of it, is old and has been used in the art. It has the desired feature that it may be opened and thus enable the audio amplifier when a carrier is received that provides a desired signal-to-noise ratio. However, an undesirable feature is that it is possible for the squelch to be opened when a strong signal is received on an adjacent channel. This is because a sufficient degree of noise quieting and reduction of positive rectified voltage across resistor 20 may also occur under this condition.

The operation of the off-channel squelch circuit of the invention will now be described. As already stated, its purpose is to guard against a false operation of the receiver circuit in response to a carrier wave at an off-tune frequency. While this circuit can be adjusted to serve also as a noise squelch and may, therefore, be used alone, it may at times be desirable to use it in combination with a noise squelch such as described above, to insure a maximum protection against noise. It will be assumed first that relay 26 is connected to the plate of tube 34 but disconnected from the plate of tube 25. Under these conditions the noise squelch would not be operative.

In the embodiment of my invention as shown in Fig. 1, I make use of the tuned coupling transformer 4 between limiter tubes 3 and 7, together with the rectifying action of limiter 7. The primary winding and the secondary winding of the transformer are each tuned by shunt condensers to the mid-frequency of the receiver channel. The voltage across the primary is applied through condenser 28 to rectifier 29 in the manner shown, with the result that a positive voltage to ground is developed across resistor 30, which is in shunt with condenser 31.

The voltage across the secondary is applied to the control grid 8 of limiter tube 7 and is rectified in the grid-cathode circuit, a negative voltage to ground appearing across resistor 5.

Potentiometer 32 is connected between the negative end of resistor 5 and the positive end of resistor 30, the other ends of the resistors being grounded. The slider 33 is connected to the grid of direct current amplifier tube 34. It will be seen, therefore, that the grid of tube 34 may be made negative, zero, or positive, depending upon the position of the slider and the relative magnitudes of the voltages across resistors 5 and 30. In the plate circuit of tube 34 is connected the winding of relay 26, which will be energized when the tube conducts. When energized, contacts 27 close and short-circuit resistor 14.

In order to understand how this circuit may operate as an off-frequency squelch, it is necessary to examine the variation of voltage across the primary and secondary windings of transformer 4 as the input carrier frequency is varied. It is an inherent characteristic of a coupled resonant circuit of this type that the voltage response at the primary terminals is broader than that at the secondary terminals, or expressing it in another way, the secondary is more sharply tuned than the primary. If the voltages across the primary and secondary after rectification are plotted with respect to the frequency of the input carrier, the resulting resonance curves will be as shown, qualitatively, by curves 35 and 36 in Fig. 2. For a given input level at the receiver, curve 35, which represents the positive rectified voltage across resistor 30, is proportional to the voltage across the primary of transformer 4, and curve 36, which represents the negative rectified voltage across resistor 5, is proportional to the voltage across the secondary. It is a further characteristic of such a coupled circuit as shown that a double peak occurs in curve 35, whereas a single peak occurs in curve 36 at the resonant frequency. The dip in curve 35 between the two peaks is advantageous, though not necessary, for the purposes of this invention.

As previously stated, the rectified voltage 36 across resistor 5 is negative with respect to ground and the rectified voltage 35 across resistor 30 is positive. In the lower part of Fig. 2 these two voltages are combined in a algebraic sense and shown as curve 37. From this curve it is seen that for a band of frequencies on each side of resonance the resultant voltage is negative, but outside of this band it is positive. In my invention it is the differential effect of voltages 35 and 36, as represented by a curve such as 37, which furnishes the means by which the squelch is controlled. It has already been explained how the differential voltage may be transmitted to the grid of squelch control tube 34 by means of potentiometer 32 and slider 33, and how the actual voltage at the grid will depend upon the setting of the slider and the relative magnitudes of voltages 35 and 36.

Figure 2:
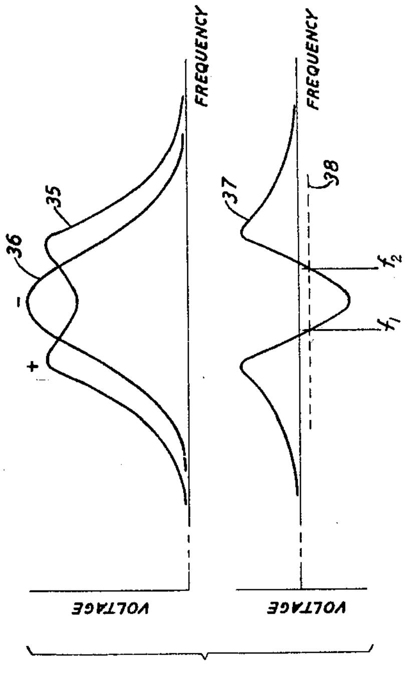
Fig. 2 shows a series of curves representing the variation of voltage at points in the circuit of Fig. 1 with variation of frequency of the received carrier.

Suppose in Fig. 2 that the dashed line 38 represents the negative cut-off voltage for tube 34. This line is intersected by curve 37 at points corresponding to frequencies $f_1$ and $f_2$. Then if the voltage 37 is applied to the grid, for all frequencies between $f_1$ and $f_2$ the grid will be sufficiently negative to hold tube 34 non-conducting, whence relay 26 will not be energized and audio amplifier tube 13 will remain operative. For frequencies outside these limits the grid voltage will be more positive than the cut-off value and tube 34 will conduct, thus causing contacts 27 to be closed and audio tube 13 to be squelched by the short-circuiting of resistor 14. The exact width of the frequency interval $f_1$ to $f_2$ will depend upon the cut-off voltage of tube 34 as represented by the line 38, and upon the relative magnitudes of voltages 35 and 36. In actual practice an interval of 60 kilocycles has been obtained, which is the band width of an assigned channel. It is seen therefore that this circuit enables the audio amplifier of the receiver for a carrier within the chosen band, but disables it if the received carrier is outside the band.

By virtue of the constant current output characteristic of a saturated limiter, the output of limiter 3 and therefore the voltage across the primary of transformer 4 will not vary much with the strength of the carrier, except for very weak inputs. For such variations as may exist, however, the voltages 35 and 36 will rise and fall together in approximately the same ratio. For this reason curves 35 and 36 in Fig. 2 will always intersect at approximately the same frequencies, and curve 37 will intersect the cut-off voltage line 38 at the frequencies $f_1$ and $f_2$, and will always have the positive and negative portions as shown in the figure, no matter what the input level may be. It is apparent therefore that the squelching action described will be assured regardless of any ordinary variation in the strength of the received carrier.

In considering the method of transmitting the differential effect of voltages 35 and 36 to the grid of tube 34, it will be apparent that the voltage at slider 33 will be the difference between a fraction of that represented by curve 35 and a fraction of that represented by curve 36, since the action of potentiometer 32 is that of a potential divider. The voltage at the grid, therefore, will be the difference between the contributions by positive voltage 35 and negative voltage 36, and these contributions will depend upon the frequency and upon the position of the slider.

In the squelch circuit just described, slider 33 of potentiometer 32 can be set so that the squelch will open on an in-tune carrier but with the same adjustment will not open on noise alone. That is to say, the circuit may be made to act as a noise squelch as well as an off-frequency squelch. This is accomplished by setting the slider when there is no carrier input, but only random noise from the earlier receiver stages, so that the voltage at the slider is zero (or slightly positive). This keeps the squelch closed. With this adjustment the contributions of voltage from resistors 5 and 30 are equal and opposite. If still more noise (but no carrier) is introduced at the antenna, the voltages across resistors 5 and 30 may increase but will increase in the same proportion, so that the voltage at slider 33 is still zero. The circuit thus acts as a guard against noise. Now when an in-tune carrier appears, the voltages across resistors 5 and 30 assume the relative values shown by corresponding points in curves 36 and 35, respectively, in Fig. 2, and the voltage at the slider will be negative, and more negative than the cut-off value, as indicated by the portion of curve 37 between $f_1$ and $f_2$. Under these conditions the squelch will open, as desired.

As already pointed out, it may be advantageous to use the off-tune carrier squelch in combination with a noise squelch as shown in the figure, in which case each may be adjusted to perform its special function independently of the other. In this case the circuits are to be connected as shown, with relay 26 connected to the plates of both tubes 25 and 34.

Figure 3:
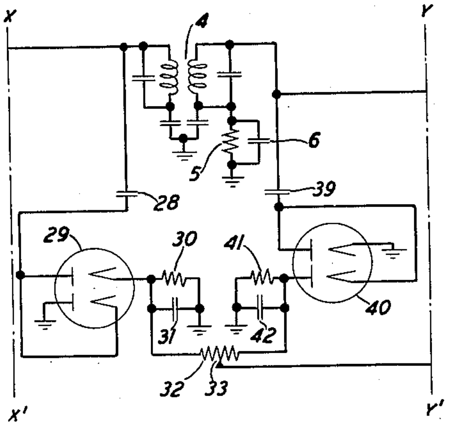
Fig. 3 represents schematically an alternative form of the invention.

In the embodiment of the invention as just described, use has been made of the grid-cathode circuit of limiter tube 7 in Fig. 1 as a rectifier to derive the negative direct current voltage used to control the squelch. Instead of using the limiter input electrodes as a rectifier, the rectification may be performed by a separate tube as illustrated in Fig. 3. The circuit shown in that figure may be substituted for the portion of the circuit included between the dashed lines XX′ and YY′ in Fig. 1. As in Fig. 1, rectifier 29 in Fig. 3 is connected through condenser 28 to the high voltage end of the primary of transformer 4, producing a positive direct current voltage across resistor 30. Rectifier 40 is connected through condenser 39 to the high voltage end of the secondary of transformer 4, producing a negative direct current voltage across resistor 41, which is in shunt with condenser 42, this voltage taking the place of the negative voltage produced by limiter 7 across resistor 5 in Fig. 1. Potentiometer 32 is connected between the positive end of resistor 30 and the negative end of resistor 41, and the difference voltage at slider 33 is conveyed to the grid of squelch control tube 34 as before.

The use of a separate rectifier as just described in place of limiter 6 affords a considerable degree of flexibility in the application of my invention. For example, with a separate rectifier it will be possible to substitute for transformer 4 any network in the receiver provided the network is preceded by a limiter and has the characteristic specified, namely, that there exist two points in the network such that the voltage-frequency response is broader at one than at the other. All that is required is to connect condensers 28 and 39 in Fig. 3 to such points. If by such connections there is danger of disturbing the voltage or current values at these points, then a vacuum tube amplifier may be interposed in each case, in the well-known manner.

Figure 4:
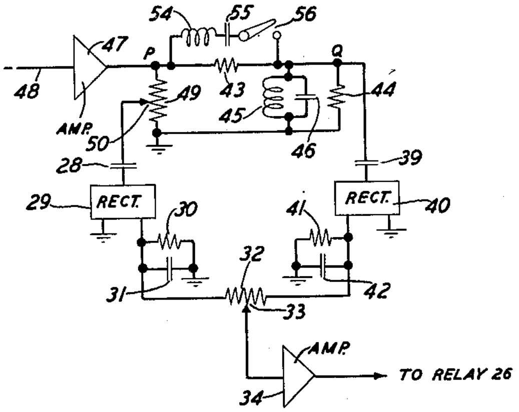
Fig. 4 is a diagrammatic representation of another modification of the invention.
Figure 5:
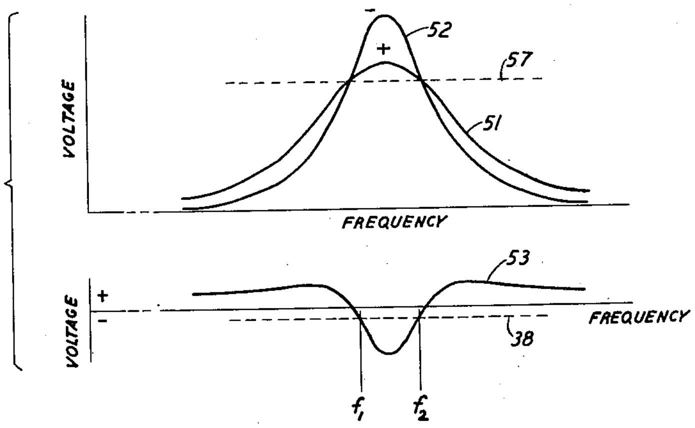
Fig. 5 shows a series of curves representing the variation of voltage with frequency at points in the circuit of Fig. 4.

In the modification shown in Fig. 4 a different type of frequency responsive network is used. This circuit is arranged as a branch path connected to the plate terminal of limiter tube 3, the normal signal path including tuned transformer 4 remaining unchanged. Conductor 48 connects the plate of tube 3 to the input of an isolating amplifier 47, the output of which is connected to the frequency responsive network at point P. The network consists of resistors 43 and 44, inductance coil 45, and condenser 46, connected as indicated. The voltage at point Q is rectified by rectifier 40 and appears as a negative direct current voltage across resistor 41. This is represented qualitatively by curve 52 in Fig. 5. Since the voltage at the network input, at point P, is greater than that at point Q, potentiometer 49 with slider 50 is connected between P and ground, so that any desired fraction of the voltage at P may be taken. The reduced voltage at slider 50 is rectified by rectifier 29 and appears as a positive direct current voltage across resistor 30. This voltage is represented qualitatively by curve 51 in Fig. 5, with a peak smaller in magnitude than that of curve 52. The difference between voltages 51 and 52 is represented by curve 53 in Fig. 5. The dashed line 38 represents the cut-off grid voltage of tube 34 as before, and is intersected by curve 53 at frequencies $f_1$ and $f_2$. Between $f_1$ and $f_2$ the difference voltage is more negative than the cut-off voltage and outside these frequency limits it is more positive. It thus possesses the required characteristics of an off-frequency squelch control voltage as exhibited by the corresponding voltage curve 37 in Fig. 2. Potentiometer 32 is connected between the positive end of resistor 30 and the negative end of resistor 41, and the differential effect of the two voltages is applied by means of slider 33 to the grid of tube 34 in the same manner as described above for Fig. 3.

The network in Fig. 4 may be a constant impedance network. This may be realized by closing contacts 56 and thereby connecting in parallel with resistor 43 the series resonant arm consisting of inductance coil 54 and condenser 55. For a constant input impedance, the values of inductances and capacitances are related to the shunting resistances in a well-known manner and are so chosen that the series resonance frequency of coil 54 and condenser 55 is the same as the anti-resonance frequency of coil 45 and condenser 46, this being the frequency to which the receiver is tuned. Then, since the current applied to the network is the output of a limiter, the voltage at point P will be constant with respect to frequency, and for some setting of slider 50 the rectified voltage across resistor 30 will be represented by a horizontal line such as the dashed line 57 in Fig. 5. The rectified voltage across resistor 41, however, will retain its resonance characteristic and will be represented by a curve such as 52. In this case the difference voltage (not shown) would still have the characteristic of changing signs with respect to the cut-off voltage of tube 34 at two frequencies such as $f_1$ and $f_2$ and would therefore be suitable for controlling the squelch as in the preceding cases.

What is claimed is:

1. In a radio receiver including a muting device responsive to direct current voltages of one polarity to disable the receiver output circuit, the method of control which comprises limiting the amplitude of the received waves, selecting from the limited received waves oscillations in a broad band of frequencies centered about the admittance band of the receiver, separately selecting from the limited received waves oscillations in a narrow frequency band at the frequency to which the receiver is tuned, rectifying the selected oscillations to produce direct current voltages, differentially combining fractional parts of the rectified voltages to produce a resultant voltage which has one polarity for carrier frequencies outside the frequency band of the receiver and the opposite polarity for carrier frequencies within the receiver band, and applying the resultant voltage to the muting device in such sense as to maintain the muting of the receiver upon the reception of a carrier wave at a frequency outside the receiver band.

2. The method of operating a muting device in a radio receiver which includes limiting the amplitude of the received carrier wave, deriving from the received carrier wave after said limiting thereof two direct current voltages of opposite polarity decreasing in magnitude at different rates with the departure of the frequency of the received carrier wave from the mid-band frequency of the receiver, differentially combining fractional parts of the two voltages so that the resultant voltage has one polarity for carrier frequencies outside the frequency band of the receiver and the opposite polarity for frequencies within the receiver band, and applying the said resultant voltage to the muting device to operate the same.

3. In combination in a radio receiver including a signal responsive device, a network having a pair of input terminals and a pair of output terminals, said network having a constant input impedance and being selectively responsive at its output terminals to received carrier waves in the frequency band to which the receiver is tuned, an amplitude limiter for received carrier waves, said limiter having its output terminals coupled to the input terminals of said network, a rectifier connected to said input terminals for developing a rectified control voltage substantially independent of frequency, a rectifier connected to said output terminals for developing a rectified control voltage of opposite polarity to that of the first rectified voltage, the second rectified voltage decreasing in magnitude with the departure of the received carrier frequency from the mid-band frequency of the receiver, a circuit differentially combining fractional parts of said rectified voltages so that the resultant voltage has one polarity for frequencies outside the frequency band of the receiver and the opposite polarity for frequencies within the band, a control device operative in response to an impressed voltage to enable or disable the said signal responsive device, and a circuit for applying the said resultant voltage to the said control device.

4. In combination in a frequency modulation receiver having a signal responsive device, an amplitude limiter for received carrier waves, a rectifier, a circuit selectively responsive to waves in the frequency band to which the receiver is tuned coupling the rectifier to the output terminals of the limiter, a control device operative in response to an impressed direct current voltage to disable the said signal responsive device, a circuit for applying the output voltage of the rectifier to the control device in such polarity as to hold the control device inoperative, and a second source of voltage included in said last-mentioned circuit of a polarity opposing the said rectified voltage and of a magnitude greater than the maximum rectified voltage produced by any received carrier wave of a frequency outside the frequency band of the receiver, but less than the maximum rectified voltage produced by a carrier wave within the receiver band.

5. A combination as specified in claim 4 in which the second source of voltage is the output of a rectifier connected across the output terminals of the limiter.

6. In a frequency modulation receiver of the type including a modulation signal amplifier, a frequency modulation detector, a first and a second limiter for received carrier waves, and a double tuned transformer selectively responsive to waves in the frequency band to which the receiver is tuned coupling the plate-cathode circuit of the first limiter to the grid-cathode circuit of the second limiter, the secondary of said transformer being more selectively responsive to such waves than the primary, a rectifier connected to the primary of said transformer for developing a positive control voltage, a resistor and a capacitor in the grid-cathode circuit of the second limiter for developing a negative control voltage, a circuit differentially combining fractional parts of said positive and negative control voltages so that the resultant voltage has one polarity for frequencies outside the frequency band of the receiver and the opposite polarity for frequencies within the band, an electron discharge device, means responsive to said resultant voltage for controlling the flow of space current in said device, and means responsive to the flow of space current in said device for rendering the said signal amplifier either operable or inoperable.

7. In a frequency modulation radio receiver having a signal responsive device preceded by a two-stage limiter with band-pass interstage transformer coupling, frequency rejector means for virtually increasing the frequency selectivity of said coupling comprising a rectifier connected to the primary of said transformer for developing a positive control voltage, a resistor and a capacitor in the grid-cathode circuit of the second limiter for developing a negative control voltage, a circuit differentially combining fractional parts of the said positive and negative control voltages so that the resultant voltage has one polarity for frequencies outside the frequency band of the receiver and the opposite polarity for frequencies within the band, an electron discharge device, means responsive to said resultant voltage for controlling the flow of space current in said device, and means responsive to the flow of space current in said device for rendering the said signal responsive device either operable or inoperable.

8. In a radio receiver including a muting device responsive to direct-current voltages of one polarity to disable the signal path of the receiver, a control system comprising an amplitude limiter for received carrier waves, a pair of coupled tuned circuits each resonant at the center frequency of the receiver band, one of said circuits being coupled to the output terminals of said limiter, rectifiers included respectively in said tuned circuits, circuit means for combining differentially fractional parts of the rectified voltages to produce a resultant voltage which has one polarity for received frequencies outside the receiver band and the opposite polarity for received frequencies within the band, and a circuit coupling said differential circuit means to said muting device to apply the resultant voltage thereto.

WILLIAM R. YOUNG, Jr.

REFERENCES CITED

The following references are of record in the file of this patent:

UNITED STATES PATENTS

| Number | Name | Date |
|---|---|---|
| 2,096,874 | Beers | Oct. 26, 1937 |
| 2,233,384 | Feldman | Feb. 25, 1941 |
| 2,273,098 | Foster | Feb. 17, 1942 |
| 2,343,115 | Noble | Feb. 29, 1944 |
| 2,370,216 | Worcester, Jr. | Feb. 27, 1945 |
| 2,400,948 | Peterson | May 28, 1946 |